Figure 1:
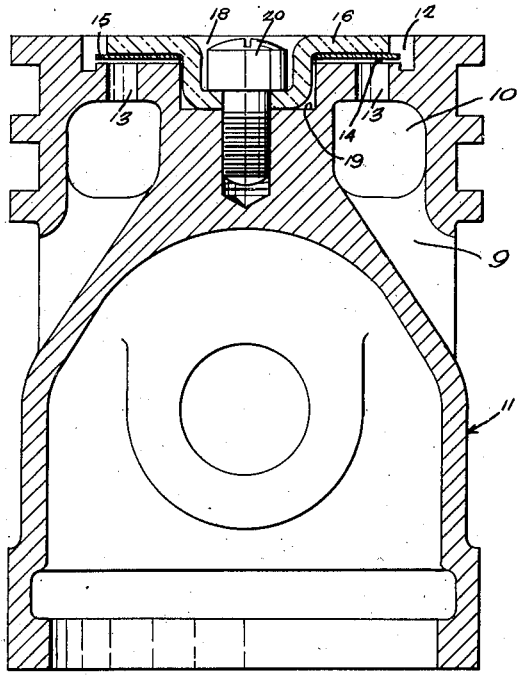

April 30, 1929.  C. C. SPREEN  1,711,253
VALVED COMPRESSOR PISTON
Filed Dec. 30, 1926

Charles C. Spreen
Inventor
by Smith and Freeman
Attorneys

Patented Apr. 30, 1929.

1,711,253

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

VALVED COMPRESSOR PISTON.

Application filed December 30, 1926. Serial No. 157,943.

Figure 2:
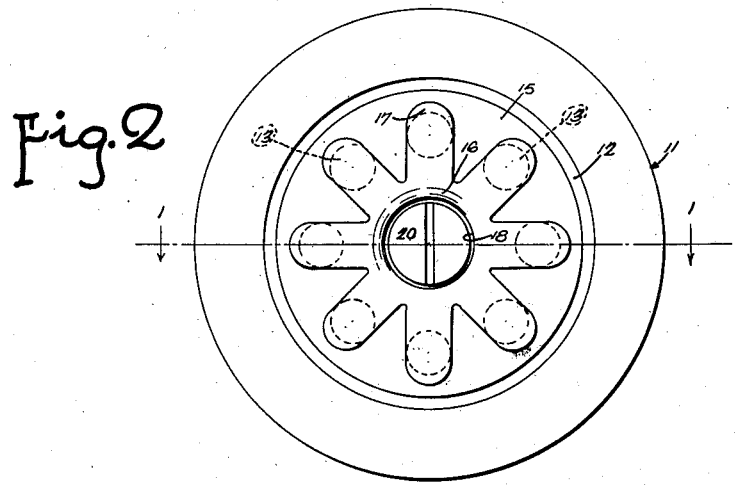

My invention relates to compressors, and more partciularly to a valve structure therefor and the particular object of my invention is to provide a new and improved piston valve of this type. In the drawings accompanying this specification and forming a part of this application, I have shown, for purposes of illustration, one form which my invention may assume. In these drawings:

Figure 1 is a central vertical section through a piston incorporating my invention, while Figure 2 is a plan view of the head end of the piston.

Referring to the drawings by characters of reference, 11 denotes the main body, or skirt, portion of a piston which in this illustration is particularly adapted for use in compressors for mechanical refrigerating systems. The head wall of the piston is provided with a centrally located circular recess 12 which is deep enough and formed to accommodate the valve structure. Passages 9 extend angularly through the wall of the piston and terminate in an interior annular chamber 10 beneath the head wall, and such passages and chamber together with a plurality of ports 13, arranged in circular relation through the end wall, establish a passageway from the exterior of the piston to the compression chamber through which gas, to be compressed, travels to the compression chamber.

The valve mechanism, as heretofore stated, is housed within the recess 12 in the head of the piston, and is arranged to cooperate with the ports 13 to control the passage of gas therethrough. A sheet metal disc 15 is arranged to engage the wall 14 forming the bottom of the recess 12, such valve being of a diameter large enough to cover all of the ports 13 when seated against the wall 14. A valve retainer 16 is provided with a depressed central portion 18 which extends into the recess 19 in the head of the piston and is retained by a screw 20 which also extends through the valve disc and is screwed into the piston head. The head of the screw lies within the cup portion of the retainer and engages the bottom wall thereof. The disc valve is provided with a central aperture which accommodates the cup shaped portion of the retainer which extends therethrough. The cup shaped portion of the retainer is formed with radially extending fingers 17, so arranged that a finger extends over each port 13, and in spaced relation therewith permitting a limited reciprocation of the disc 15. The stop member, or retainer, is preferably formed as an integral rigid member, and the fingers are spaced above the wall 14 sufficiently to allow a slight reciprocation of the disc valve, thus the valve can move upwardly permitting passage of gas from the chamber 10 through the ports 13 during the charge taking stroke of the piston, and will be forced against the seat 14 to close the ports 13 during the compression stroke of the piston.

From the above disclosure it will be obvious to those skilled in the art that I have provided improved means for mounting valve means on a compressor piston used in mechanical refrigerating systems. At the same time it also will be obvious to those skilled in the art that the embodiment of the invention herein shown and described may be variously changed and modified without departing from the spirit of my invention or sacrificing the advantages thereof, and it therefore will be understood that the disclosure herein is illustrative only, and that my invention is not limited thereto.

I claim:

1. A valve structure, for a piston having a recessed head and a plurality of ports through the end wall forming the bottom of the recess, comprising a valve retainer entirely within the recess in the head of said piston comprising a cup shaped central portion having finger extensions projecting therefrom in spaced relation and over-lying each of the ports in said piston end wall, and a disc valve reciprocably mounted intermediate said retainer fingers and said piston end wall, the cup shaped portion of said retainer extending through said disc valve and being secured to said piston head.

2. A valve structure, for a piston having a recessed head and a plurality of ports through the end wall forming the bottom of the recess, comprising a valve retainer entirely within the recess in the head of said piston comprising a cup shaped central portion secured to said piston head and having radially extending fingers projecting therefrom in spaced relation with and overlying each of said ports, and a disc valve reciprocably mounted intermediate said retainer fingers and said piston end wall, said valve being reciprocal bodily to open and close said ports.

3. A valve structure, for a piston having a recessed head and a plurality of ports through the end wall forming the bottom of the recess, comprising a valve retainer means entirely within the recess in the head of said piston, said retainer means comprising a cup shaped central portion having finger extensions over-lying each of said ports and a screw having its head within said cup shaped extension for securing the bottom thereof to the piston head, and a reciprocable disc valve intermediate said ports and said retainer fingers, said cup shaped portion of said retainer means extending through said disc valve.

In testimony whereof I hereunto affix my signature.

CHARLES C. SPREEN.